United States Patent
Mironets et al.

(10) Patent No.: US 10,265,772 B2
(45) Date of Patent: Apr. 23, 2019

(54) UNINTERUPPTED FILTERING SYSTEM FOR SELECTIVE LASER MELTING POWDER BED ADDITIVE MANUFACTURING PROCESS

(71) Applicant: United Technologies Corporation, Hartford, CT (US)

(72) Inventors: Sergey Mironets, Charlotte, NC (US); Lulues Suhani, Lexington Park, MD (US); Louis Porretti, Plantsville, CT (US)

(73) Assignee: United Technologies Corporation, Farmington, CT (US)

(*) Notice: Subject to any disclaimer, the term of this patent is extended or adjusted under 35 U.S.C. 154(b) by 683 days.

(21) Appl. No.: 14/772,770

(22) PCT Filed: Mar. 11, 2014

(86) PCT No.: PCT/US2014/023528
§ 371 (c)(1),
(2) Date: Sep. 3, 2015

(87) PCT Pub. No.: WO2014/164807
PCT Pub. Date: Oct. 9, 2014

(65) Prior Publication Data
US 2016/0001364 A1    Jan. 7, 2016

Related U.S. Application Data

(60) Provisional application No. 61/779,132, filed on Mar. 13, 2013.

(51) Int. Cl.
*B22F 3/10* (2006.01)
*B33Y 40/00* (2015.01)
(Continued)

(52) U.S. Cl.
CPC ............ *B22F 3/1007* (2013.01); *B22F 3/008* (2013.01); *B22F 3/1055* (2013.01);
(Continued)

(58) Field of Classification Search
CPC ..... B33Y 40/00; B23K 26/342; B22F 3/1007; B22F 3/1055; B22F 2003/1056; B22F 2003/1059
See application file for complete search history.

(56) References Cited

U.S. PATENT DOCUMENTS

| 5,460,733 A | 10/1995 | Rasmussen et al. |
| 7,168,935 B1 * | 1/2007 | Taminger ........... B23K 15/0073 219/121.12 |

(Continued)

FOREIGN PATENT DOCUMENTS

| BE | 799073 A1 | 8/1973 |
| CN | 101607348 A | 12/2009 |

(Continued)

OTHER PUBLICATIONS

Machine translation of Japan Patent document No. 2006-124,732, Jan. 2018.*

(Continued)

*Primary Examiner* — Geoffrey S Evans
(74) *Attorney, Agent, or Firm* — Kinney & Lange, P.A.

(57) ABSTRACT

A solid freeform manufacturing system includes a manufacturing chamber containing a powder based additive manufacturing device. The manufacturing chamber is connected to an environmental control chamber. The environmental control chamber contains environmental control devices including fans, filters, and an inert gas source. An interconnection between the environmental control chamber and manufacturing chamber allows an inert, contaminant free manufacturing environment.

14 Claims, 3 Drawing Sheets

(51) Int. Cl.

| | |
|---|---|
| *B23K 26/342* | (2014.01) |
| *B22F 3/105* | (2006.01) |
| *B33Y 10/00* | (2015.01) |
| *B33Y 30/00* | (2015.01) |
| *B23K 26/142* | (2014.01) |
| *B22F 3/00* | (2006.01) |
| *B23K 15/00* | (2006.01) |
| *B23K 15/02* | (2006.01) |
| *B23K 15/10* | (2006.01) |
| *B23K 26/12* | (2014.01) |
| *B29C 64/153* | (2017.01) |
| *B29C 64/371* | (2017.01) |

(52) U.S. Cl.
CPC .......... *B23K 15/0086* (2013.01); *B23K 15/02* (2013.01); *B23K 15/10* (2013.01); *B23K 26/125* (2013.01); *B23K 26/142* (2015.10); *B23K 26/342* (2015.10); *B29C 64/153* (2017.08); *B29C 64/371* (2017.08); *B33Y 10/00* (2014.12); *B33Y 30/00* (2014.12); *B22F 2003/1056* (2013.01); *Y02P 10/295* (2015.11)

(56) References Cited

U.S. PATENT DOCUMENTS

| | | | | |
|---|---|---|---|---|
| 2002/0090313 | A1 | 7/2002 | Wang et al. | |
| 2011/0265893 | A1* | 11/2011 | Scott | B01D 46/0058 137/544 |
| 2011/0291331 | A1* | 12/2011 | Scott | B22F 3/1055 264/510 |
| 2013/0197829 | A1* | 8/2013 | Sherman, III | B01D 46/0086 702/45 |
| 2016/0271885 | A1* | 9/2016 | Shi | B33Y 40/00 |
| 2018/0043614 | A1* | 2/2018 | Greenfield | B33Y 30/00 |
| 2018/0065081 | A1* | 3/2018 | Herzog | B33Y 40/00 |
| 2018/0126461 | A1* | 5/2018 | Buller | B33Y 40/00 |
| 2018/0126650 | A1* | 5/2018 | Murphree | B29C 64/245 |
| 2018/0133637 | A1* | 5/2018 | Stammberger | B29C 64/35 |
| 2018/0244034 | A1* | 8/2018 | Sutcliffe | B33Y 10/00 |

FOREIGN PATENT DOCUMENTS

| | | | |
|---|---|---|---|
| CN | 201603654 | U | 10/2010 |
| CN | 102164696 | A | 8/2011 |
| CN | 102186554 | A | 9/2011 |
| JP | 2006-124732 | * | 5/2006 |
| JP | 2006124732 | A | 5/2006 |
| JP | 4131260 | B2 | 8/2008 |
| JP | 2010047813 | A | 3/2010 |
| JP | 2012501828 | A | 1/2012 |
| WO | 9208592 | A1 | 5/1992 |
| WO | WO9208592 | | 5/1992 |
| WO | 2010026396 | A2 | 3/2010 |

OTHER PUBLICATIONS

Extended European Search Report dated Mar. 16, 2016, for corresponding European Patent Application No. 4778329.4.

European Office Action, for European Patent Application No. 14778329.4, dated Jul. 24, 2017, 5 pages.

The International Search Report and Written Opinion for PCT Application U.S. Appl. No. PCT/US2014/023528, dated Jul. 30, 2014, 12 pages.

First Chinese Office Action, for Chinese Patent Application No. 201480014529.7, dated Aug. 2, 2016, 21 pages.

Second Chinese Office Action, for Chinese Patent Application No. 201480014529.7, dated Apr. 25, 2017, 5 pages.

Japanese Rejection Decision, for Japanese Patent Application No. 2016-501274, dated Jan. 30, 2018, 12 pages.

* cited by examiner

UNINTERUPPTED FILTERING SYSTEM FOR SELECTIVE LASER MELTING POWDER BED ADDITIVE MANUFACTURING PROCESS

BACKGROUND

This invention relates generally to the field of additive manufacturing. In particular, the invention relates to atmosphere control in an additive manufacturing environment.

Additive manufacturing refers to a category of manufacturing methods characterized by the fact that the finished part is created by layer-wise construction of a plurality of thin sheets of material. Additive manufacturing may involve applying liquid or powder material to a workstage, then doing some combination of sintering, curing, melting, and/or cutting to create a layer. The process is repeated up to several thousand times to construct the desired finished component or article.

Various types of additive manufacturing are known. Examples include stereo lithography (additively manufacturing objects from layers of a cured photosensitive liquid), electron beam melting (using a powder as feedstock and selectively melting the powder using an electron beam), laser additive manufacturing (using a powder as a feedstock and selectively melting the powder using a laser), and laser object manufacturing (applying thin solid sheets of material over a workstage and using a laser to cut away unwanted portions).

Additive manufacturing processes typically require managed environments to protect the product from deterioration or contamination. Inert or otherwise unreactive gas flow atmospheres are typical. Argon, nitrogen, and, in some cases, vacuum environments are known in the art. The environmental control system of an additive manufacturing process is a critical component of the system.

SUMMARY

A solid freeform manufacturing system includes a manufacturing chamber containing a powder based additive manufacturing device. The manufacturing chamber is connected to an environmental control chamber. The environmental control chamber contains environmental devices including fans, filters, and an inert gas source. An interconnection between the environmental control chamber and manufacturing chambers allows the manufacturing to proceed in an inert, contamination free environment.

A method of manufacturing a solid freeform object includes creating an inert contamination free environment in a manufacturing chamber by connecting a manufacturing chamber to an environmental control chamber. An inert environment is circulated through the manufacturing chamber by blowing filtered inert gas from an environmental control device in the environmental control chamber through an interconnection with the manufacturing chamber into the manufacturing chamber. If filters in the environmental control device become clogged, another environmental control device is connected to the manufacturing chamber to allow manufacturing to proceed without interruption.

DETAILED DESCRIPTION

Figure 1:
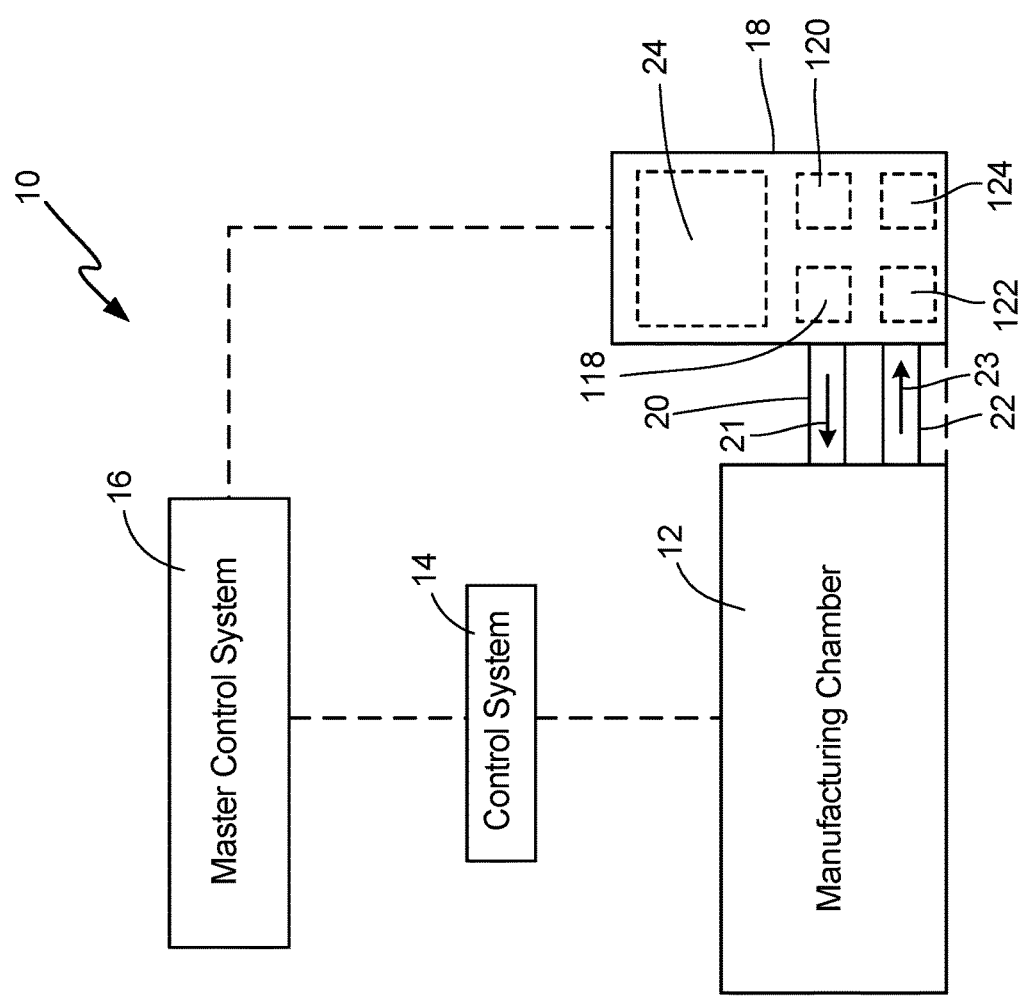
FIG. 1 is a schematic of an additive manufacturing setup.

FIG. 1 is a schematic of an additive manufacturing process. Process 10 includes manufacturing chamber 12 containing devices that produce solid freeform objects by additive manufacturing. Embodiments that fabricate objects according to the invention may be produced by direct laser sintering (DLS) manufacturing, direct laser melting (DLM) manufacturing, selective laser sintering (SLS) manufacturing, selective laser melting (SLM) manufacturing, laser engineering net shaping (LENS) manufacturing, electron beam melting (EBM) manufacturing, direct metal deposition (DMD) manufacturing, and others known in the art.

Manufacturing is controlled by manufacturing control system 14. Control system 14 may allow fully automatic, semi-automatic, or manual control of the additive manufacturing process in manufacturing chamber 12.

The manufacturing environment in manufacturing chamber 12 is controlled by environmental control chamber 18. Environmental control chamber 18 provides the environment required to produce flaw free solid freeform objects having structural integrity, dimensional accuracy, and required surface finish. Since the powder based additive manufacturing processes of the invention requires partial or complete melting of the powder feedstock, a protective atmosphere, in most cases, is required. Protective atmosphere may include inert or unreactive gases such as argon, helium, nitrogen, or mixtures thereof. In other cases, a vacuum environment may be required.

Environmental control chamber 18 may provide an inert build atmosphere in chamber 12 by filling chamber 12 with an inert gas through, for instance, duct 20 in the direction of arrow 21. The gas may be transported into chamber 12 with blower system 118 in chamber 18. In order to continually provide a fresh environment, gas entering chamber 12 in duct 20 is returned to environmental control chamber 18 through duct 22 in the direction of arrow 23. Gas returning through duct 22 naturally contains loose powder from the additive manufacturing build process. As a result, gas entering chamber 12 through duct 20 needs to be filtered. Filter system 120 is a required component of environmental control chamber 18 for powder based additive manufacturing. All components of environmental control chamber 18, such as blowers 118, valves 122, and inert gas sources 124 may be automatically, semi-automatically, or manually controlled by environmental control system 24. Both environmental control system 24 and manufacturing chamber control system 14 are under the control of master control system 16 which may afford automatic, semi-automatic, and manual control for total system 10.

Figure 2:
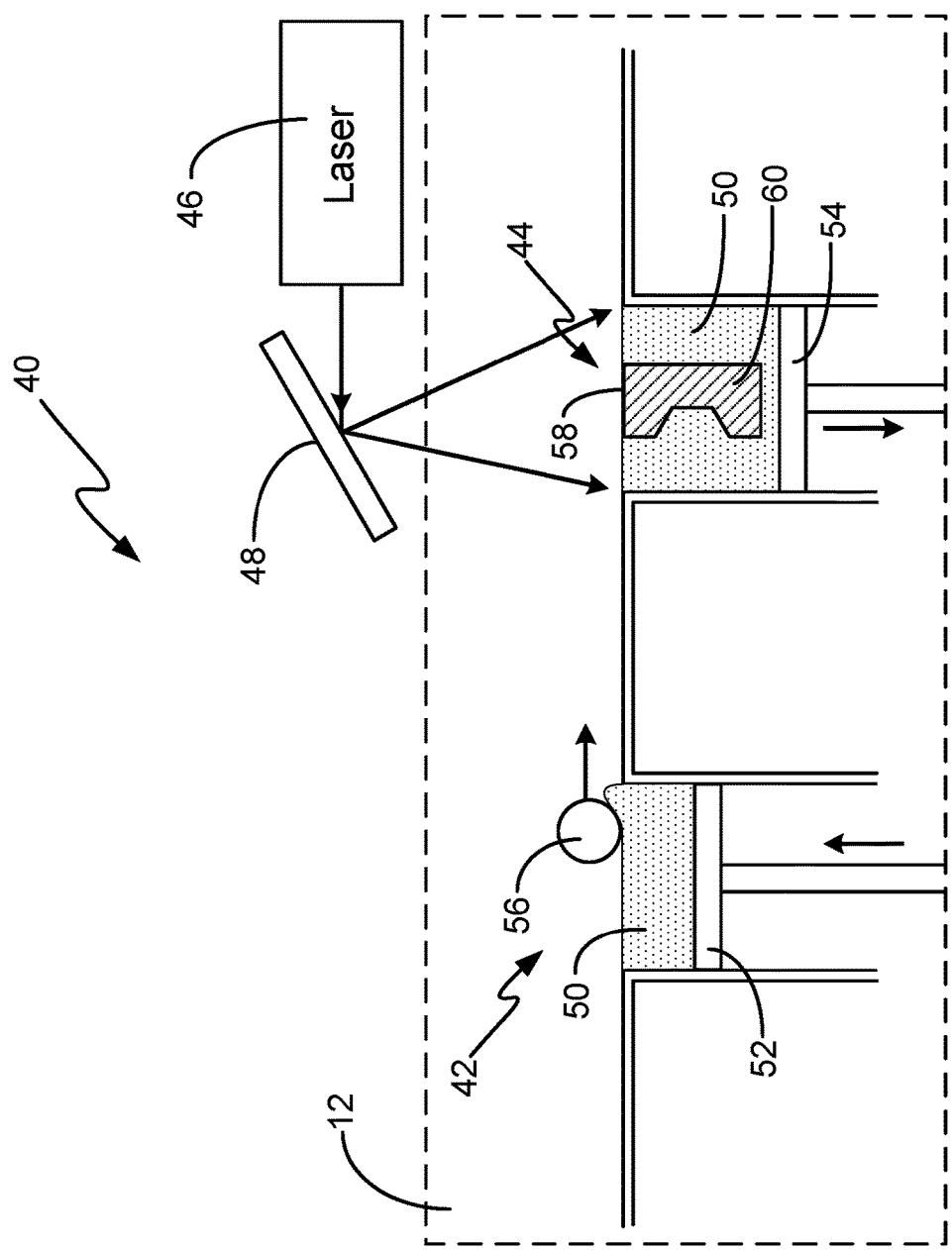
FIG. 2 is a schematic of an example additive manufacturing process in the manufacturing chamber of the invention.

An embodiment of the invention is illustrated in FIG. 2 wherein selective laser sintering (SLS) device 40 is shown housed in manufacturing chamber 12. SLS device 40 comprises powder storage chamber 42, build chamber 44, laser 46, and scanning minor 48. During operation of SLS device 40, powder 50 is fed upward by piston 52 and is spread over build platform 54 by roller 56. After powder 50 is spread as an even layer on build platform 54, laser 46 and scanning minor 48 are activated to direct a laser beam over build platform 54 to sinter selective areas of powder 50 to form a single layer 58 of solid object 60 and to attach the sintered areas to the underlying platform according to a computer model of object 60 stored in an STL memory file. In the next step, roller 56 is returned to a starting position, piston 52 advances to expose another layer of powder, and build platform 54 indexes down by one layer thickness. Roller 56 then spreads powder 50 over the surface of build platform 54 containing selectively sintered areas. Laser 46 and scanning minor 48 are activated and selective areas of the deposited layer are again sintered and joined to the underlying layer. The process is repeated until solid freeform part 60 is completed. Process 40 is only an example of a solid freeform manufacturing process and is not meant to limit the invention to any single process known in the art.

The duration of a solid freeform manufacturing process build time depends on many factors, such as workpiece material, powder feed system, sintering mechanism, atmosphere purity, and others. In some cases, the build process time can exceed the time it takes for filters in environmental control device 18 to become completely blocked. In that case, the build may need to be interrupted while filters are changed and the manufacturing environment contaminated by oxygen or other undesirable species. The interruption may cause irreparable damage to the part under construction.

Figure 3:
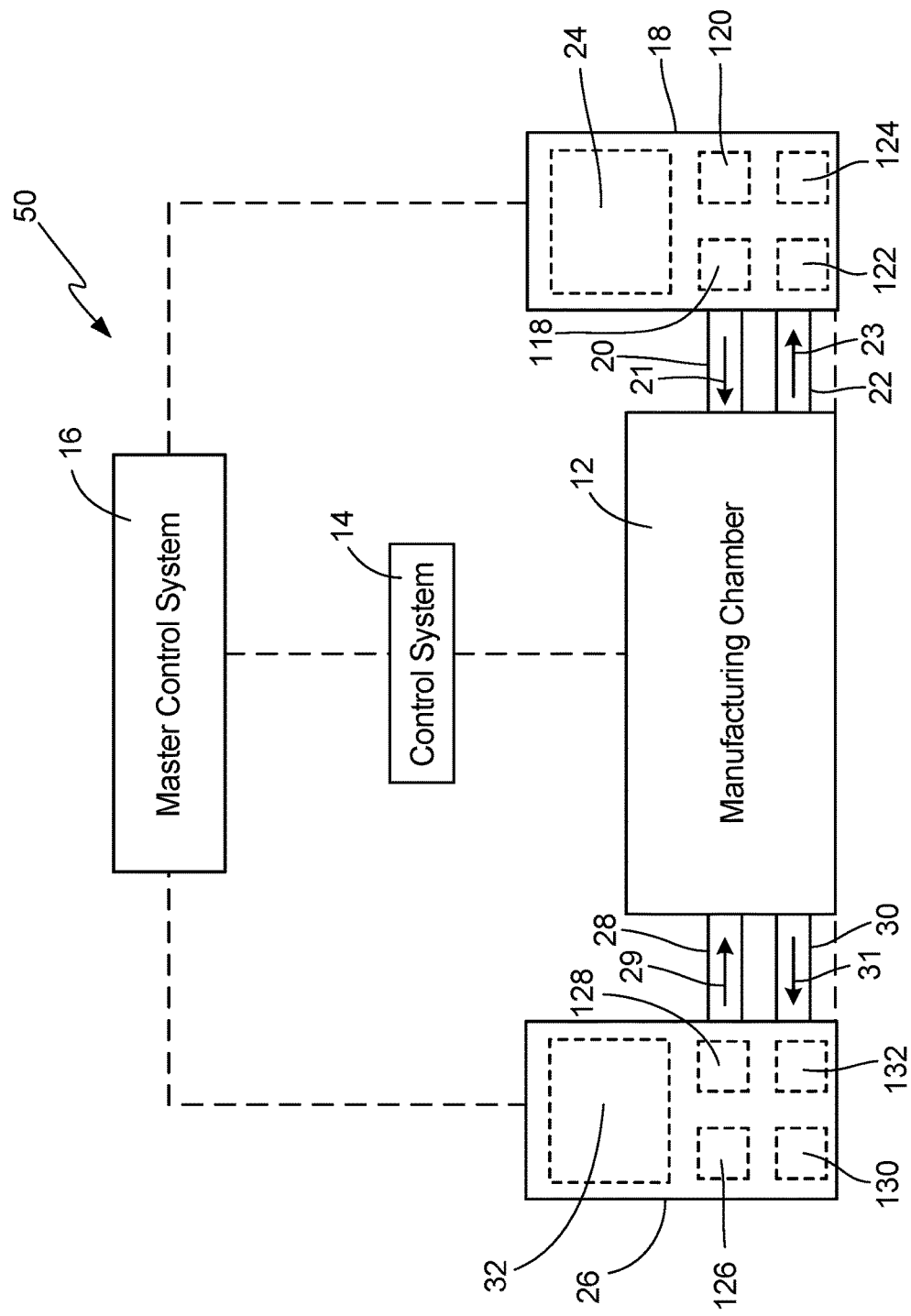
FIG. 3 is a schematic of an additive manufacturing setup with redundant atmospheric control.

An embodiment that addresses this problem is shown in FIG. 3. Improved additive manufacturing process 50 includes environmental control chamber 26 with control system 32 added to system 10 to provide additional atmospheric control in the event that environmental control device 18 ceases to operate due to filter failure. Environmental control chamber 26, containing filter system 126, blowers 128, valves 130, inert gas sources 132, and control system 32 may be identical to environmental control chamber 18 and control system 24. This system may be interconnected to manufacturing chamber 12 by ducts 28 and 30 and to master control system 16, wherein inert gas may enter manufacturing chamber 12 through duct 28 in the direction of arrow 29 and may return to environmental control device 26 through duct 30 in the direction of arrow 31 as shown.

During a build, if environmental control chamber 18 ceases to operate, it can be shut down and environmental control chamber 26 can be activated to provide environmental support without interruption, thereby allowing solid freeform builds of any duration to take place. Environmental control chambers 18 and 26 and corresponding control systems 24 and 32, respectively, are shown in FIG. 3. as remote, free standing units. In other embodiments they may be housed in a single remote structure or incorporated into manufacturing chamber 12 as required by design. While only two environmental control units are shown, others may be added as necessary.

DISCUSSION OF POSSIBLE EMBODIMENTS

The following are non-exclusive descriptions of possible embodiments of the present invention.

A solid freeform object manufacturing system can include: a manufacturing chamber containing a powder based additive manufacturing device; a first environmental control chamber containing environmental control devices; and an interconnection between the manufacturing and environmental control chambers.

The system of the preceding paragraph can optionally include, additionally and/or alternatively, any one or more of the following features, configurations, and/or additional components:

The additive manufacturing device may be selected from the group consisting of: a direct laser sintering apparatus; a direct laser melting apparatus; a selective laser sintering apparatus; a selective laser melting apparatus; a laser engineered net shaping apparatus; an electron beam melting apparatus; and a direct metal deposition apparatus;

The environmental control device may include at least a blower, filter, control system, and inert gas source.

The inert gas source may include helium, neon, argon, nitrogen, and mixtures thereof.

The interconnection may include duct work, valves, and control systems.

The valve operation may be automatic, semi-automatic, or with manual override.

Filters in the environmental control devices may have finite lifetimes due to filter clogging.

At least a second environmental control chamber may be added to the system.

The added environmental control chambers may be interconnected to the manufacturing chamber.

The interconnection may include duct work, valves, and control systems.

The valve operation may be automatic, semi-automatic, or with manual override.

A method of manufacturing a freeform object may include: creating an inert environment in a manufacturing chamber by connecting an environmental control chamber to the manufacturing chamber; circulating an inert environment through the manufacturing chamber by blowing filtered inert gas from a first environmental control device in the environmental control chamber through an interconnection with the manufacturing chamber; operating an additive manufacturing device in the manufacturing chamber for a time it takes to produce a freeform object; changing the inert gas source to a second environmental control device in a second environmental control chamber through an interconnection with the manufacturing chamber without interrupting the inert gas flow to guarantee a successful build if the operating time exceeds the time it takes to clog the filter in the first environmental control device.

The method of the preceding paragraph can optionally include, additionally and/or alternatively, any one or more of the following features, configurations, and/or additional components:

The first and second environmental control devices may include at least a blower, filter, control system, and inert gas source.

The filters in the environmental control devices may have finite lifetimes due to filter clogging.

The interconnections between the manufacturing chamber and the environmental control chambers may include duct work, valves, and control systems.

The valve operation may be automatic, semi-automatic, or with manual override.

The additive manufacturing device may be selected from the group consisting of: a direct laser sintering apparatus; a direct laser melting apparatus; a selective laser sintering apparatus; a selective laser melting apparatus; a laser engineered net shaping apparatus; an electron beam melting apparatus; and a direct metal deposition apparatus.

Although the present invention has been described with reference to preferred embodiments, workers skilled in the art will recognize that changes may be made in form and detail without departing from the spirit and scope of the invention.

The invention claimed is:

1. A solid freeform object manufacturing system comprising:
   a manufacturing chamber containing a powder based additive manufacturing device;

a first environmental control chamber containing first environmental control devices;
a first interconnection between the manufacturing chamber and the first environmental control chamber;
a second environmental control chamber identical to the first environmental chamber and the second environmental chamber containing second environmental control devices identical to the first environmental control devices; and
a second interconnection between the manufacturing chamber and the second environmental control chamber;
wherein the second environmental control system is redundant to the first environmental control system such that when the freeform object manufacturing system is operating, only the first or second environmental control system is activated.

2. The system of claim 1, wherein the additive manufacturing device is selected from the group consisting of:
a direct laser sintering apparatus;
a direct laser melting apparatus;
a selective laser sintering apparatus;
a selective laser melting apparatus;
a laser engineered net shaping apparatus;
an electron beam melting apparatus; and
a direct metal deposition apparatus.

3. The system of claim 1, wherein the first and second environmental control devices each comprise at least a blower, filter, and inert gas source.

4. The system of claim 3, wherein the inert gas source comprises helium, neon, argon, nitrogen, or mixtures thereof.

5. The system of claim 3, wherein the filters in the first and second environmental control chambers have finite lifetimes due to filter clogging.

6. The system of claim 1, wherein the first and second interconnections each comprise duct work through which gas flow is controlled by valves.

7. The system of claim 6, wherein operation of the valves is automatic, semi-automatic, or with manual override.

8. A method of manufacturing a freeform object, the method comprising:
creating an inert environment in a manufacturing chamber by connecting a first environmental control chamber to the manufacturing chamber and blowing filtered inert gas from the first environmental control chamber through a first interconnection with the manufacturing chamber;
operating an additive manufacturing device in the manufacturing chamber for a time it takes to produce a freeform object; and
changing to connection of a second environmental control chamber identical to the first environmental control chamber to the manufacturing chamber through a second interconnection with the manufacturing chamber through which inert gas is blown from the second environmental control chamber, without interrupting flow of the inert gas to the manufacturing chamber, to guarantee a successful build if the operating time exceeds the time it takes to clog a filter in the first environmental control chamber;
wherein the second environmental control chamber is redundant to the first environmental control chamber such that during manufacturing of the freeform object, only the first or second environmental control chamber is activated.

9. The method of claim 8, wherein the first and second environmental control chambers each comprise at least a blower, filter, and inert gas source.

10. The method of claim 9, wherein the filter in each of the first and second environmental control chambers has a finite lifetime due to filter clogging.

11. The method of claim 8, wherein the first and second interconnections between the manufacturing chamber and the first and second environmental control chambers, respectively, each comprises duct work through which gas flow is controlled by valves.

12. The method of claim 11, wherein operation of the valves is automatic, semi-automatic, or with manual override.

13. The method of claim 8, wherein the additive manufacturing device is selected from the group consisting of:
a direct laser sintering apparatus;
a direct laser melting apparatus;
a selective laser sintering apparatus;
a selective laser melting apparatus;
a laser engineered net shaping apparatus;
an electron beam melting apparatus; and
a direct metal deposition apparatus.

14. The method of claim 8, wherein the manufacturing chamber and the first and second environmental control chambers are under the control of a master control system.

* * * * *

UNITED STATES PATENT AND TRADEMARK OFFICE
CERTIFICATE OF CORRECTION

PATENT NO. : 10,265,772 B2
APPLICATION NO. : 14/772770
DATED : April 23, 2019
INVENTOR(S) : Sergey Mironets, Lulues Suhani and Louis Porretti It is certified that error appears in the above-identified patent and that said Letters Patent is hereby corrected as shown below:

In the Specification

Column 2, Line 58:
Delete "minor"
Insert --mirror--

Column 2, Line 62:
Delete "minor"
Insert --mirror--

Column 3, Line 5:
Delete "minor"
Insert --mirror--

Signed and Sealed this
Fourth Day of June, 2019

Andrei Iancu
*Director of the United States Patent and Trademark Office*